(12) United States Patent
Duarte et al.

(10) Patent No.: US 7,471,058 B2
(45) Date of Patent: Dec. 30, 2008

(54) STARTING DEVICE AND STARTING METHOD FOR A SINGLE-PHASE INDUCTION MOTOR

(75) Inventors: Ronaldo Riberio Duarte, Joinville (BR); Marcos Guilherme Schwarz, Joinville (BR); Luiz Magalhaes Medeiros Neto, Joinville (BR)

(73) Assignee: Empresa Brasileira De Compressores S.A., Embraco Joinville - SC (BR)

( * ) Notice: Subject to any disclaimer, the term of this patent is extended or adjusted under 35 U.S.C. 154(b) by 152 days.

(21) Appl. No.: 10/595,302

(22) PCT Filed: Oct. 8, 2004

(86) PCT No.: PCT/BR2004/000197

§ 371 (c)(1),
(2), (4) Date: Jul. 13, 2006

(87) PCT Pub. No.: WO2005/034330

PCT Pub. Date: Apr. 14, 2005

(65) Prior Publication Data

US 2006/0273752 A1 Dec. 7, 2006

(30) Foreign Application Priority Data

Oct. 8, 2003 (BR) .................................. PI 0303967

(51) Int. Cl.
*H02P 1/42* (2006.01)
(52) U.S. Cl. ....................................... 318/791; 318/779
(58) Field of Classification Search ................. 318/791, 318/779
See application file for complete search history.

(56) References Cited

U.S. PATENT DOCUMENTS 3,624,470 A * 11/1971 Johnson ....................... 318/789
4,401,933 A * 8/1983 Davy et al. .................. 318/778
4,455,521 A 6/1984 Day et al.

(Continued)

FOREIGN PATENT DOCUMENTS

EP   0 840 437 A1   5/1998

(Continued)

OTHER PUBLICATIONS

International Search Report for International Application No. PCT/BR2004/000197, date of mailing Feb. 7, 2005.

*Primary Examiner*—Walter Benson
*Assistant Examiner*—Antony M Paul
(74) *Attorney, Agent, or Firm*—Darby & Darby P.C.

(57) ABSTRACT

A starting device and starting method for a single-phase induction motor, housing: a stator having a running coil and a starting coil; a running switch and a starting switch which is conducted to an open condition upon completion of the motor start. The starting device includes: a starting circuit including a control unit which receives, from a current sensor, signals representative of the current level being supplied to the stator, the control unit being connected to the running and the starting switches, for instruction the open and closed conditions thereof; the open condition of the starting switch being defined when the ratio between the present current level supplied to the stator and the starting current level, upon the closing of the starting and the running switches, reaches a predetermined value.

11 Claims, 3 Drawing Sheets

U.S. PATENT DOCUMENTS

| | | | | |
|---|---|---|---|---|
| 4,622,506 A | * | 11/1986 | Shemanske et al. | 318/786 |
| 4,764,714 A | * | 8/1988 | Alley et al. | 318/786 |
| 4,843,295 A | * | 6/1989 | Thompson et al. | 318/786 |
| 5,051,681 A | | 9/1991 | Schwarz | |
| 5,053,908 A | | 10/1991 | Cooper et al. | |
| 5,296,795 A | * | 3/1994 | Dropps et al. | 318/778 |
| 5,892,349 A | * | 4/1999 | Bogwicz et al. | 318/772 |
| 6,380,708 B1 | * | 4/2002 | Gritter et al. | 318/778 |

FOREIGN PATENT DOCUMENTS

| | | |
|---|---|---|
| FR | 2 585 900 A1 | 2/1987 |
| FR | 2585900 A1 * | 2/1987 |
| GB | 997433 | 7/1965 |
| GB | 2 088 658 A | 6/1982 |
| GB | 2088658 A * | 6/1982 |
| WO | WO-0209624 | 2/2002 |

\* cited by examiner

STARTING DEVICE AND STARTING METHOD FOR A SINGLE-PHASE INDUCTION MOTOR

This is a U.S. national phase application under 35 U.S.C. §371 of International Patent Application No. PCT/BR2004/000197, filed Oct. 8, 2004, and claims benefit of Brazilian Patent Application No. PI 0303967-6, filed Oct. 8, 2003 both of which are incorporated by reference herein. The International Application was published in English on Apr. 14, 2005 as WO 2005/034330 A1 under PCT Article 21(2).

FIELD OF THE INVENTION

The present invention refers to an electronic starting device of the type used in electric motors, particularly in single-phase induction motors.

BACKGROUND OF THE INVENTION

Single-phase induction motors are widely used, due to their simplicity, strength and high performance. They are generally found in household appliances, such as refrigerators, freezers, air conditioners, hermetic compressors, laundry machines, pumps, fans, and in some industrial applications.

The known induction motors are usually provided with a cage type rotor and a coiled stator having two windings, one for the running coil and the other for the starting coil. During the normal operation of the compressor, the running coil is supplied by an AC voltage and the starting coil is temporarily supplied at the beginning of the starting operation, creating a turning magnetic field in the air gap of the stator, a necessary condition to accelerate the rotor and start the motor.

This turning magnetic field can be obtained by supplying the starting coil with a current that is time-displaced in relation to the current circulating in the main coil, preferably at an angle close to 90 degrees. This time-displacement between the current circulating in both coils is achieved by constructive characteristics of the coils or by installing an external impedance in series with one of the coils, but generally in series with the starting coil. The value of this current circulating through the starting coil during the starting process of the motor is generally high, requiring the use of some type of switch which can interrupt this current after the time required to promote motor acceleration has elapsed.

For the motors in which very high efficiency is required, this starting coil is not completely switched off after the starting period has elapsed and a capacitor, namely a running capacitor, is maintained connected in series with said starting coil, providing enough current to increase the maximum torque of the motor and its efficiency.

For the motors with this construction, using a permanent impedance in series with the starting coil during the normal operation of the motor, there are known some starting devices, such as PTC, electromechanical relay, timers, or combinations in which a PTC is connected in series with a device that interrupts the passage of current after a determined time (RSP), as described in U.S. Pat. Nos. 5,053,908 and 5,051,681 and in the international co-pending patent application WO02/09624A1 of the same applicant.

One of the components widely used for starting the motors of the split phase type, in which a running capacitor is not used, is the electromechanical relay. Its wide use is related to its low manufacturing cost and simple technology. On the other hand, the electromechanical relay presents several limitations, especially the need of dimensioning a specific component for each size of electric motor, the impossibility of using it in high efficiency motors in which a running capacitor is used, generation of electromagnetic and other noises during operation of the motor and wear of its components caused by electric arc and mechanical friction.

An alternative for the electromechanical relay is the PTC (positive coefficient temperature) device. This component is widely used in high efficiency motors whose application is associated with a running capacitor. Since such component is a ceramic tablet having no movable parts, its principle overcomes most limitations of the electromechanical relay. Since its operation is based on heating a ceramic tablet, increasing its electrical resistance and consequently limiting the circulating current, there occurs dissipation of residual power during all its operating time. Another limitation of this component is related to the time interval required to allow consecutive starts to occur.

One of the great advantages is the possibility of using a single component to operate in the start of a family of motors with a determined voltage (115V or 220V), but which becomes a limitation when the analyzed characteristic is the optimization of the energizing time of the auxiliary coil. Its conduction time is directly proportional to the volume of the ceramic tablet and inversely proportional to the circulating current, resulting in a reduced starting time when applied to high power motors, and in an excessively long time when applied to smaller motors. These two facts lead to a deficiency in the start of the larger motors and to higher energy consumption during the starting period of the smaller motors.

On the other hand, the timed starting components eliminate the great disadvantage of the PTC residual consumption, but do not overcome the deficiency in the starting time required for the different motor sizes. Its concept permits dimensioning a circuit which provides the optimized starting time for the different motor sizes. Thus, it is mandatory the existence of several components to comply with a family of electric motors, resulting in products of different models, adjustments in the production lines, and higher inventories. Such devices disregard the operating conditions in the starting instant and are thus dimensioned for the worst condition, increasing the starting time.

OBJECTS OF THE INVENTION

Thus, it is an object of the present invention to provide a starting device having a simple, strong and low cost construction, which permits: large scale usage in low cost systems, presenting the advantages of the timed devices in which the residual power consumption is eliminated; reducing the number of components so as to comply with a determined family of motors having the same supply voltage; the use in high efficiency motors with running capacitors; and which presents the characteristic of the electromechanical relays, in which the starting time is optimized for each electric motor size.

It is a further object of the present invention to provide a starting method for a single phase induction motor, which optimizes the starting time as a function of the size and load of the motor connected thereto.

It is a further object of the present invention to provide a starting method for a single phase induction motor, which optimizes the starting time, automatically, as a function of the power system voltage.

It is a further object of the present invention to provide a starting electronic device for a single phase induction motor with negligible energy consumption.

It is a further object of the present invention to provide a starting electronic device for a single phase induction motor, which can operate jointly with a starting capacitor or other impedance installed in series with the starting coil of the motor.

It is still a further object of the present invention to provide a starting electronic device for a single phase induction motor which is not susceptible to transients or disturbances coming from the power system.

DISCLOSURE OF THE INVENTION

These and other objects are attained through a starting device for a single phase induction motor comprising: a stator having a running coil and a starting coil; a power source which supplies current to said running coil and said starting coil; a running switch and a starting switch, respectively connecting the running coil and the starting coil to the power source when in a closed condition, said starting switch being conducted to an open condition upon completion of the motor start, said starting device comprising a starting circuit including, besides the running and the starting switches: a current sensor, connected in series between the power source and the stator, in order to detect the current level supplied to the latter; and a control unit supplied by the power source and receiving, from the current sensor, signals representative of the current level being supplied to the stator, said control unit being operatively connected to the running and to the starting switches, in order to instruct the open and closed conditions thereof, the open condition of the starting switch being defined when the ratio between the present current level supplied to the stator and informed by the current sensor to the control unit and the starting current level previously informed to said control unit by the current sensor upon the closing of both the starting and the running switches, reaches a value that is equal or inferior to a predetermined value.

The objects of the present invention are also attained through a starting method for single phase induction motors of the type defined above, comprising the steps of:

a—detecting the starting current level during a first time interval, after the closing of the starting and the running switches, by a current sensor connected in series between the power source and the stator, and informing said starting current level to a control unit supplied by the power source and connected to the current sensor, in order to receive, from the latter, information about the current being supplied to the stator;

b—detecting a present current level drawn by the stator during a second time interval subsequent to the first time interval after the closing of the starting and running switches, and informing said present current level to the control unit;

c—comparing the present current level drawn by the stator with that value or the starting current level; and d—opening the starting switch when the ratio between the present current level drawn by the stator and the starting current level reaches a value that is equal or inferior to a predetermined value.

The starting electronic circuit of the present invention is of the type which comprises using a mechanism for controlling the current consumption of at least one of the motor coils during the running period, storing the value read during the starting period.

Such function can be obtained, for example by reading the voltage drop provoked in a low impedance resistor subject to the current consumed by the electric motor. The electronic circuit further comprises using a mechanism for monitoring the voltage of the power system, storing the value read during the starting period, in order to allow correcting the predetermined value, upon the occurrence of voltage variations in the power system. Such function can be obtained, for example, by reading the voltage drop in a resistive divider.

As it is characteristic in an induction motor, at the moment in which it is connected to the supply voltage, the current begins to circulate through the main coil and through the auxiliary coil. In this instant, the current consumed by the electric motor is highly increased, greatly sensitizing the mechanism that detects the current consumed by the motor. With the beginning of the rotation of the electric motor rotor, caused by interaction of the magnetic field created by the current passing through both the running and the starting coils, the consumed current is gradually reduced to levels which will proportionally diminish the sensitiveness of the consumed current detecting mechanism. This process will continuously progress, until the motor reaches the rotation speed close to the synchronous, in which the sensitiveness of the current detecting mechanism will be sufficiently low to allow the circuit to switch off the starting coil. From this moment on, there will only exist current in the starting coil, provided by the running capacitor, if installed.

Since the current is recorded in each starting period, the starting device is sensitive to the different torque levels required during the starting process, so that load variations in the motor shaft which can extend the starting period will maintain the energization in the starting coil during a period long enough to overcome the restrictions imposed to the electric motor. On the other hand, in a situation where the load condition imposed to the motor during said period is reduced, the rotor acceleration will occur in a shorter period, promoting a more accentuated reduction in the current levels consumed by the electric motor, so that the device can disable the starting coil more rapidly.

Besides its susceptibility to load variation during the start, the solution of the present invention further allows optimizing the energizing time of the starting coil for different supply voltages (undervoltage, nominal voltage or overvoltage) and for different temperature conditions of the electric motor windings.

BRIEF DESCRIPTION OF THE DRAWINGS

The invention will be described below, with reference to the attached drawings, in which.

DESCRIPTION OF THE ILLUSTRATED EMBODIMENTS

Figure 1:
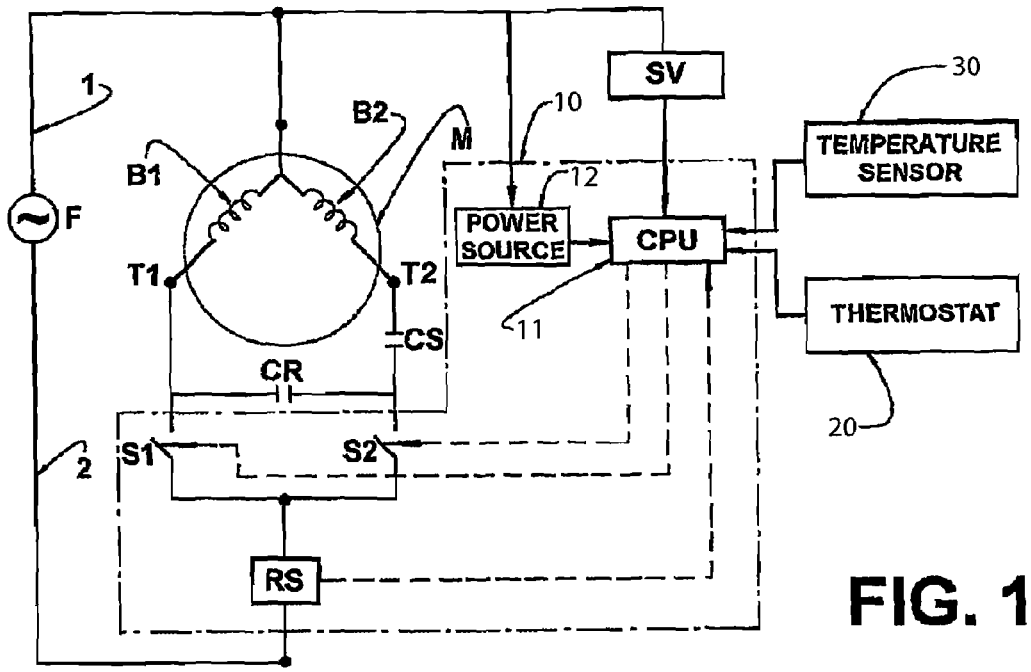
FIG. 1 illustrates, schematically, an embodiment of a starting device constructed according to the present invention.
Figure 2:
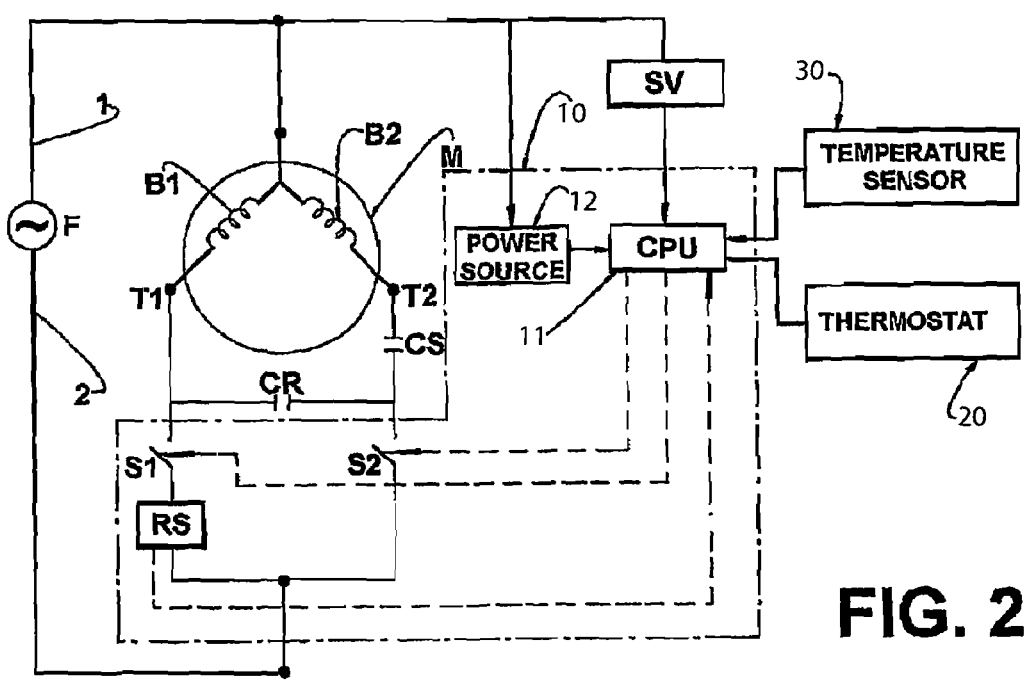
FIG. 2 illustrates, schematically, another embodiment for the starting device shown in FIG. 1 and constructed according to the present invention.

The starting device for a single phase induction motor of the present invention will be described for a motor comprising: a stator B having a running coil B1 and a starting coil B2; a power source F, which supplies current to both the running coil B1 and the starting coil B2; a running switch S1 and a starting switch S2, respectively connecting the running coil B1 and the starting coil B2 to the power source F when in a closed condition, said starting switch S2 being conducted to an open condition upon completion of the motor start, said starting device comprising a starting circuit 10 including, besides the running switch S1 and the starting switch S2: a current sensor RS connected in series between the power source F and the stator B, in order to detect the current level supplied to the latter; and a control unit 11 supplied by the power source F and receiving, from the current sensor RS, signals representative of the current level being supplied to the stator B and, from a voltage sensor SV connected between the power source F and said control unit 11, signals representative of the voltage level of the power source F, said control unit 11 being operatively connected to both the running switch S1 and the starting switch S2. According to FIG. 1, the AC power source F supplies energy to the running coil B1 and the starting coil B2 of the stator B of the motor through a first supply terminal 1 of the power source F, connected to the running coil B1 and to the starting coil B2 of the stator B, to the voltage sensor SV, and to a supply source 12 of the starting circuit 10 which supplies voltage to the control unit 11. A second supply terminal 2 of the power source F is connected to the current sensor RS, which in FIG. 1 is disposed in series between the power source F and the running and starting switches S1 and S2. In another embodiment of the present invention, illustrated in FIG. 2, the current sensor RS is disposed in series between the power source F and the running switch S1, in order to consider only the current of the running coil B1 of the stator B. This solution has the advantage of reducing the current that is circulating through the current sensor RS.

In an embodiment of the present invention, the starting device allows using a running capacitor CR disposed in parallel between a terminal T1 and a terminal T2 of the stator B, which are respectively associated with the running coil B1 and the starting coil B2 of said stator B, so as to provide the necessary time displacement between the currents passing through said running coil B1 and starting coil B2 during the normal operation of the motor, and a capacitor CS disposed in series with the starting coil B2 so as to provide said time displacement during the motor start.

Once the circuit receives a switch-on command from an external device, for example an electromechanical or electronic thermostat 20, or by reading a temperature sensor 30 adequately installed in the system, the control unit 11 of the starting circuit 10 of the present invention instructs the closing of the running and the starting switches S1 and S2, in a synchronized mode when the reading of the power system voltage is zero, detected through the voltage sensor SV connected to the control unit 11.

The running and the starting switches S1 and S2 are closed in the instant the power system voltage is zero, in order to reduce the current peak in said switches and in the power system, avoiding generation of electromagnetic noise and stress of said switches. The running and the starting switches S1 and S2 can have electromechanical contacts or static AC semi-conducting switches, for example TRIACS.

Figure 3:
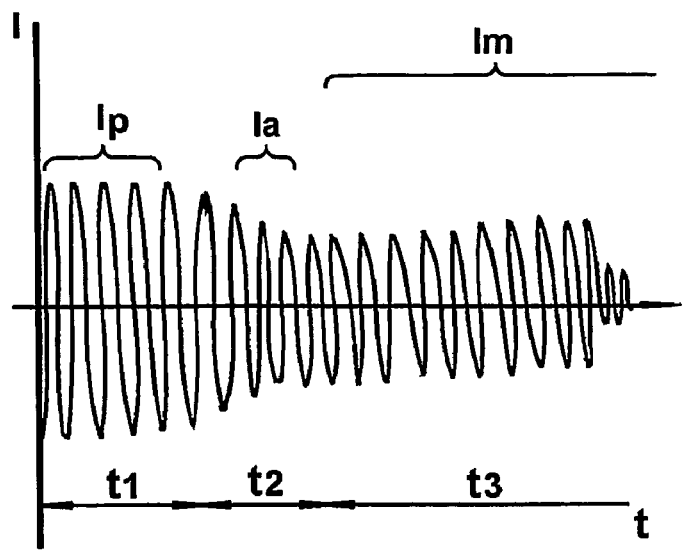
FIG. 3 illustrates, schematically, current levels being drawn by the motor stator and observed, as to time, during the start (t1, t2) and in a motor running condition, with the auxiliary coil energized (t3), and after the time (t3) with the motor running only with the main coil energized, obtained in the prior art starting circuits for electric motors.
Figure 4:
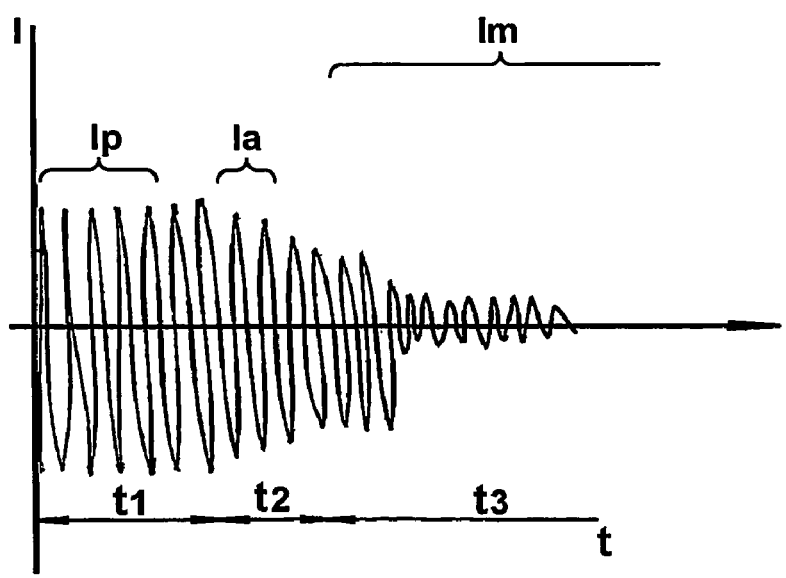
FIG. 4 illustrates, schematically, current levels being drawn by the motor stator and observed, as to time, during the start (t1, t2) and in a motor running condition, with the auxiliary coil energized (t3), and after the time (t3) with the motor running only with the main coil energized, obtained with the present starting device for electric motors.

The circulation of current through the motor, which occurs through a current sensor RS, for example a low impedance resistor, generates in the latter a voltage or current signal that is proportional to the motor current, which is then applied to the start circuit 10, for example in the form of an AD converter input, not illustrated, of a micro-controller. During the first cycles after the closing of the running and starting switches S1 and S2, for motor supply, the current is measured and the initial information of the latter is obtained. During said period, the motor does not reach a significant rotation and the current level detected by the current sensor RS during these first cycles is very close to the level which is characteristic of the rotor blocked condition for this type of motor, being then stored by the control unit 11 of the start circuit 10 as a starting current level Ip. In this same time interval, there is also obtained, through the voltage sensor SV, the information of the voltage in the power system and this value is stored as Vp. With reference to FIGS. 3 and 4, the motor current remains approximately constant during the first starting time interval t1, after which, in a second time interval t2, the measured current level begins to decrease gradually, as the rotor begins to rotate. After reaching the running regimen, close to the motor load condition, the motor total current is stabilized, as indicated in FIGS. 3 and 4 by a third time interval t3, when the starting coil B2 is still found de-energized.

After determining the starting current level Ip, which occurs during the time interval t1, the present current level is continuously measured as Ia and the ratio between these values is constantly calculated as K;

$$K = \frac{Ia}{Ip}$$

At each new detection of the present current level Ia, a new value for K is calculated. The first calculated value for K will be very close to 1, since this present current level will occur in an instant immediately after the sampling which defined the starting current level Ip. While the rotor remains blocked, or is found much below the running rotation, the present current level Ia will have a value close to that of the starting current level Ip, and consequently K will have a value equal or slightly inferior to 1. As the motor accelerates, the calculated K values diminish in the same rate as the current of the stator B diminishes, which is a consequence of the CEMF (counter electromotive force) generated in the coils of the stator B as a function of the interaction with the currents in the rotor during its rotation.

Upon receiving each information about the present current level Ia drawn by the stator B, the control unit 11 calculates a ratio K between each said present current level Ia supplied to the stator B and informed by the current sensor RS to the control unit 11 and the starting current level Ip, so that when said ratio K reaches a value equal or inferior to a predetermined value Km, the control unit 11 instructs the opening of the starting switch S2, i.e., the ratio K is constantly compared with a predetermined value Km and when K is equal or inferior to this value Km, the starting circuit 10 ends the motor start and the control unit instructs the opening of the starting switch S2.

The predetermined value Km is constantly adjusted by the control unit 11 as being equal to the product of a reference value Kr multiplied by the ratio between the voltage read at the starting moment Vp and the present voltage Va, which voltages are detected by the control unit 11 by means of the voltage sensor SV, mathematically:

$$Km = Kr \cdot \frac{Vstart}{Vpresent}$$

If the voltage does not suffer alterations during the starting period, i.e., the present voltage Va is always equal to the starting voltage Vp, then the predetermined value Km will maintain the reference value Kr. However, if after the start the voltage suffers alterations, for example diminishing, the current will suffer a less significant reduction at the end of the start, since besides the CEMF, the power system reduction factor will significantly influence the motor current. In this example, the predetermined value Km is increased according to voltage variation. If, after the start the voltage increases, the motor current will not reduce accordingly, since the voltage increase causes a current decrease. In this case, the predetermined value Km will be reduced to compensate for this variation. With this logic, the circuit keeps the starting coil B2 energized only during the time required for the start, optimizing the start even when fluctuations occur in the power system.

The reference value Kr is previously defined, as a function of its application, family of motors, and expected voltage of the power system and it can, for example be defined between 0.2 and 0.8, depending on the parameters mentioned above and on the circuit topology: if the current measured is the total current of the circuit or only of the running coil B2. The reference value Kr is then defined during implementation of the circuit as being the ratio between a running current level Im drawn by the stator B in a motor running condition, and said starting current Ip for expected load conditions, type of motor and power system voltage.

Figure 5:
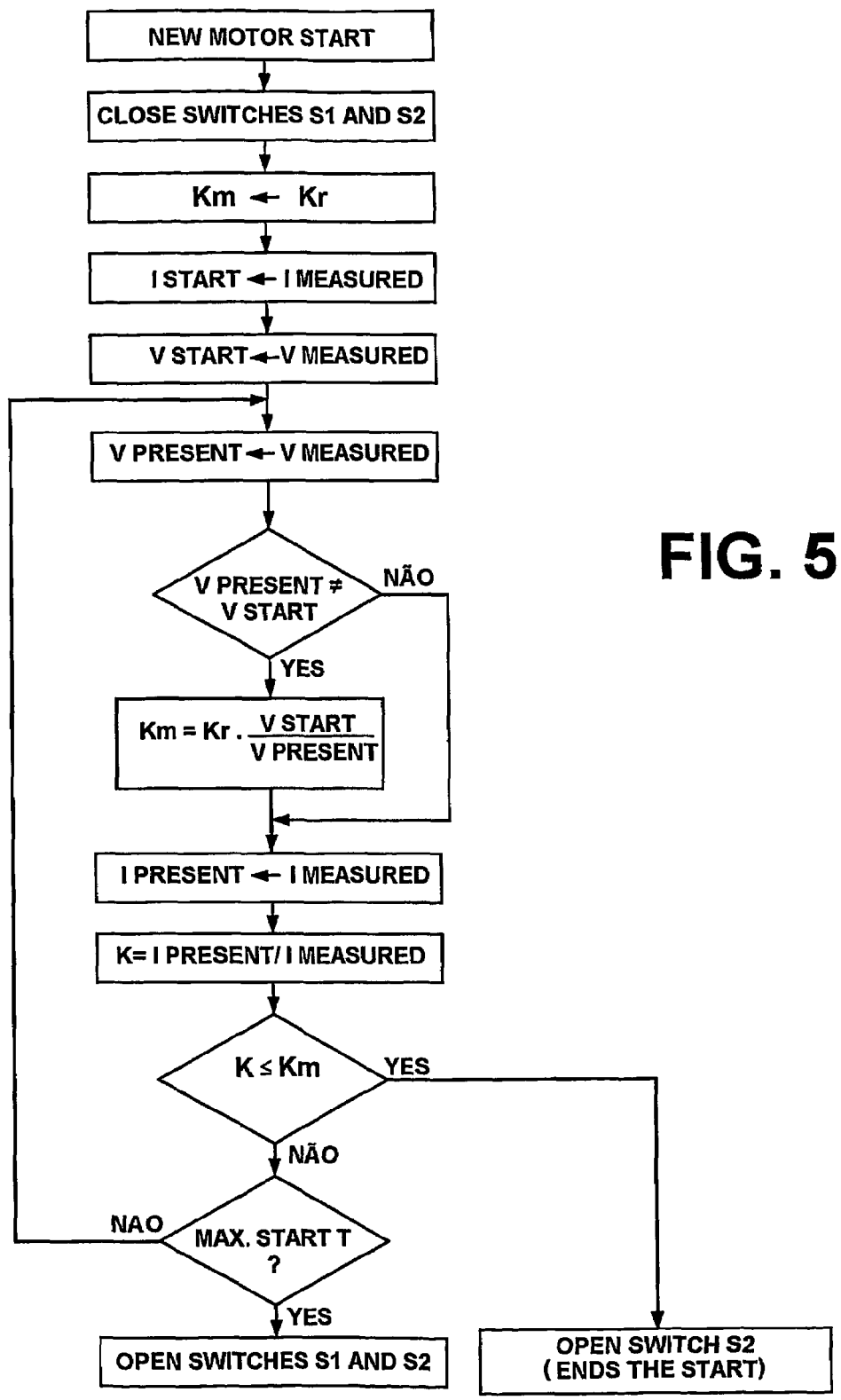
FIG. 5 illustrates the flowchart of the starting circuit logic.

FIG. 3 illustrates the motor current in one start, presenting timing devices according to the prior art; FIG. 4 illustrates the current during the start, with the proposed solution; and FIG. 5 illustrates the start logic executed by the circuit.

At each new motor start, a new starting current level Ip is stored by the control unit, so that the circuit can automatically adapt to the new conditions of load, of power system voltages (overvoltage or undervoltage) and to temperature conditions of both the running coil B1 and the starting coil B2 of the stator B. Due to the storage being made at each new start cycle, the circuit does not require previous calibration for certain motors whose operation is based on the percentage reduction of the current value and not of the current itself, so that the same circuit can be applied to a wide range of motors.

In case an unsuccessful attempt to start the motor occurs, in which the rotor remains blocked and there is no reduction in the measured current value, the control unit instructs the opening of the starting and running switches S1 and S2 when the ratio between a present current level Ia drawn by the stator B and the starting current level Ip is higher than the predetermined value Km, within a maximum time interval which has been previously defined for ending the motor start. In this condition, the first time interval t1 indicated in FIGS. 3 and 4 will be unduly extended, reaching a maximum allowed time, and the opening of both the running switch S1 and the starting switch S2 will protect the motor and said switches. In this case, the circuit will await the adequate motor cooling time and/or the time required to adapt the load condition to the torque delivered by the motor, before allowing a new start cycle to begin.

During the normal operation of the motor, the current is constantly measured and compared with a limit and, if this limit is surpassed, the control unit 11 will provide the opening of both the running switch S1 and the start switch S2, protecting the motor.

The invention claimed is:

1. A starting device for a single phase induction motor comprising:

a stator having a running coil and a starting coil;

a power source which supplies current to said running coil and said starting coil;

a running switch and a starting switch, respectively connecting the running coil and the starting coil to the power source when in a closed condition, said starting switch being conducted to an open condition upon completion of the motor start;

a current sensor connected in series between the power source and the stator, in order to detect the current level supplied to the latter; and a control unit supplied by the power source and receiving, from the current sensor, signals representative of the current level being supplied to the stator, wherein said control unit is operatively connected to the running switch and to the starting switch, in order to instruct the open and closed conditions thereof, the open condition of the starting switch being defined when the ratio (K) between the present current level (Ia) supplied to the stator and informed by the current sensor to the control unit and the starting current level (Ip) previously informed to said control unit by the current sensor upon the closing of the starting and the running switches, so that when said ratio K reaches a value that is equal or inferior to a predetermined value (Km) the control switch instructs the opening of the starting switch, wherein the value of Km is constantly adjusted.

2. A starting device, according to claim 1 and comprising a voltage sensor connected to the power system, in order to detect the voltage level in the power system, and with the control unit receiving, from the voltage sensor, signals representative of the voltage level in the power system, wherein the value (Km) is equal to the product of a reference value (Kr) multiplied by the ratio between the voltage read in the starting moment (Vp) and the present voltage (Va) detected by the control unit.

3. A starting device, according to claim 2, wherein the reference value (Kr) corresponds to the ratio between the running current level (Im) drawn by the stator in a motor running condition and the starting current level (Ip), in at least one of the expected load conditions characteristic of the motor and of the power system voltage.

4. A starting device, according to claim 3, wherein the control unit instructs the opening of the running switch and of the starting switch when the ratio (K) between a present current level (Ia) drawn by the stator and the starting current level (Ip) is superior to the value (Km) after a maximum time interval previously defined for ending the motor start has elapsed.

5. A starting device, according to claim 1, wherein the current sensor is disposed in series between the power source and the running switch.

6. A starting device, according to claim 1, wherein the current sensor is disposed in series between the power source and the running and starting switches.

7. A starting device, according to claim 1, further comprising:

a running capacitor disposed parallel to the running and starting switches and a starting capacitor disposed in series with the starting coil.

8. A starting method for a single phase induction motor of the type comprising:

a stator with a running coil and a starting coil for operating jointly with an AC power source which supplies current to said running coil and said starting coil;

a running switch and a starting switch, respectively connecting the running coil and the starting coil to the power source when in a closed condition, said starting switch being conducted to an open condition upon completion of the motor start, comprising the steps of:

detecting the starting current level (Ip) supplied to the stator during a first time interval, after the closing of the starting and the running switches by a current sensor connected in series between the power source and the stator, and informing said starting current level (Ip) to a control unit supplied by the power source and connected to the current sensor in order to receive, from the latter, information about the current being supplied to the stator;

detecting a present current level (Ia) drawn by the stator during a second time interval subsequent to the first time interval after the closing of the starting and running switches, and informing said present current level (Ia) to the control unit;

comparing the present current level (Ia) drawn by the stator with that value of the starting current level (Ip); and opening the starting switch when the ratio between the present current level (Ia) drawn by the stator and the starting current level (Ip) reaches a value that is equal or inferior to a predetermined value (Km).

9. A starting method, according to claim 8, comprising the additional steps of:

detecting the voltage level in the power system in a first time interval, after the closing of the starting and running switches, by a voltage sensor connected to the power system, and informing said starting voltage level (Vp) to a control unit supplied by the power source and connected to the voltage sensor in order to receive, from the latter, information about the power system voltage;

detecting a present voltage level (Va) of the power system during a second time interval subsequent to the first time interval after the closing of the starting and running switches, and informing said present voltage level (Va) to the control unit;

comparing the present voltage level (Va) with that value of the starting voltage level (Vp);

calculating a value (Km) as being equal to the product of a predefined reference value (Kr) multiplied by the ratio between the voltage read at the start moment, (Vp), and the present voltage (Va) detected by the control unit; and opening the starting switch when the ratio (K) between the present current level (Ia) drawn by the stator and the starting current level (Ip) is greater than a value (Km) after a maximum time interval previously defined for motor start completion has elapsed.

10. A starting method, according to claim 8, wherein the step of detecting a present current level (Ia) drawn by the stator is the one which supplies the running coil of the stator.

11. A starting method, according to claim 8, wherein the step of detecting a present current level (Ia) drawn by the stator is the one which supplies current to the running coil and the starting coil of the stator.

* * * * *